United States Patent

Son et al.

Patent Number: 6,138,245
Date of Patent: Oct. 24, 2000

[54] SYSTEM AND METHOD FOR AUTOMATIC DEVICE SYNCHRONIZATION

[75] Inventors: William Y. Son; Elbert A. McLaren, II; Seung B. Yi, all of San Diego, Calif.

[73] Assignee: Neopoint, Inc., La Jolla, Calif.

[21] Appl. No.: 09/245,823

[22] Filed: Feb. 5, 1999

[51] Int. Cl.[7] ...................................................... G06F 1/12
[52] U.S. Cl. ........................ 713/400; 709/219; 709/304
[58] Field of Search .................................... 713/400, 401, 713/500, 501, 502, 600; 709/201, 248, 217, 218, 219, 304; 710/5

[56] References Cited

U.S. PATENT DOCUMENTS

| | | | |
|---|---|---|---|
| 3,830,962 | 8/1974 | Mailloux | 178/6 |
| 5,671,375 | 9/1997 | Stockstad et al. | 710/129 |
| 5,689,550 | 11/1997 | Garson et al. | 379/89 |
| 5,706,291 | 1/1998 | Kainulainen et al. | 370/503 |
| 5,717,737 | 2/1998 | Doviak et al. | 379/58 |
| 6,029,072 | 2/2000 | Barber | 455/557 |

Primary Examiner—Reba I. Elmore
Assistant Examiner—Rijue Mai
Attorney, Agent, or Firm—Lyon & Lyon LLP

[57] ABSTRACT

A wireless communication apparatus capable of providing information requests includes a wireless communication device having a wireless transceiver configured to send and receive communications across a wireless communication network. A hands-free unit can be included and coupled to the wireless communication device. The hands-free unit includes a speaker and a microphone configured to provide audio information to a user and to accept audio information from the user. A position determination system determines a location of the apparatus and provides position data indicative of such location to a server along with the information request. The server can process the information request along with the position information and provide a response to the request to the wireless communication apparatus.

17 Claims, 5 Drawing Sheets

SYSTEM AND METHOD FOR AUTOMATIC DEVICE SYNCHRONIZATION

BACKGROUND OF THE INVENTION

1. Field of the Invention

The present invention relates generally to electronic devices and more specifically to a system and method for providing automatic synchronization of an electronic device with a host.

2. Related Art

The advent of wireless personal communications devices has revolutionized the telecommunications industry. Cellular, PCS and other services provide wireless personal communications to businesses and individuals at home, in the office, on the road, and virtually anywhere the wireless network reaches. Wireless telephone subscribers no longer have to stop at pay telephones along the road, or wait until they return home or to the office to check messages and return important business calls. Instead, wireless subscribers carry out their day to day business from their cars, from the jobsite, while walking along the airport concourse, and just about anywhere their signals are accessible.

Thus, it is no surprise that since the introduction of the cellular telephone service, the number of wireless telephone subscribers has increased steadily. Today, the number of wireless telephone subscribers is staggering and still growing rapidly. In fact, many households have multiple wireless telephones in addition to their conventional land-line services.

With a market of this size, there is fierce competition among hardware manufacturers and service providers. In an attempt to lure customers, most providers offer handsets with desirable features or attributes such as small size, light weight, longer battery life, speed dial, and so forth. Many recent additions to the marketplace include multi-functional handsets that even provide pocket-organizer functions integrated into the wireless handset. Most manufacturers, however, are still scrambling to add new features to their communication devices to snare a portion of this booming market.

SUMMARY OF THE INVENTION

The present invention is directed toward a system and method for providing automatic synchronization of a portable electronic device with a host computer. More specifically, in one implementation of the invention, the invention provides a system and method for synchronizing a portable electronic device, such as a wireless communication handset having personal organizer functionality, with a host computer having the same or similar functionality. According to one aspect of the invention, connection of the electronic device with a device interface enables automatic synchronization of the device with the host computer.

In one implementation, the automatic synchronization is effectuated in part by circuitry in the interface that is triggered by the connection of the interface to the electronic device. Specifically, in one application, a power signal is provided from the electronic device to the interface upon connection. The power signal enables a buffer or buffers in the interface, which drives a pre-selected logic level to the electronic device. This logic level sets a status signal true and the status signal is sensed by a processor at the device. Upon sensing a true status signal, the processor begins the automatic synchronization process. Thus, in this scenario, connection of the electronic device to the interface automatically begins the synchronization process without additional acts required on the part of the user.

According to another aspect of the invention, connection of the electronic device to the interface can automatically launch the appropriate application on the host computer. As such, intervention-free synchronization can occur even if the corresponding application is not running on the host computer.

According to yet another aspect of the invention, the automatic synchronization feature can be enabled or disabled as desired by the user. In one application of this aspect, a soft switch is provided, allowing the user to enable or disable the automatic synchronization feature. Although such a soft switch can be implemented using a number of different techniques, one technique utilizes a menu-driven approach, allowing the user to scroll through menu screens to reach and select the function of enabling or disabling the automatic synchronization.

The circuitry enabling automatic synchronization can be provided in an interface cable connected between the host computer and the electronic device or in a docking station.

According to another aspect of the invention, functionality can be provided to detect a disconnect and reconnect of the electronic device and the interface. This functionality can be included to provide the removal of a mask which would otherwise be used to disable the automatic synchronization. More specifically, in certain scenarios it may be desirable to disable the automatic synchronization using a mask or other disabling circuitry or software. It may also be desirable in these scenarios to automatically remove this mask and allow automatic synchronization to occur should the device be disconnected from the interface and then reconnected.

BRIEF DESCRIPTION OF THE DRAWINGS

FIG. 1 is a wireless communication handset.

DETAILED DESCRIPTION OF THE PREFERRED EMBODIMENTS

1. Introduction and Overview

The present invention is directed toward a system and method for providing synchronization between electronic devices. More specifically, according to one aspect of the invention, a system and method are provided to allow automatic synchronization between a portable electronic device such as, for example, an electronic organizer, and a host computer such as, for example, a user's personal computer.

According to a preferred embodiment, the synchronization process can commence automatically without the need for the user to depress a key or key sequence to initiate the process. In this embodiment, the connection of the device to the host computer automatically initiates the synchronization process and data transfer. Specifically, in one embodiment, the device monitors one or more signal lines across which data is transferred. When the monitoring detects that the device is connected to the host computer, the synchronization process is initiated and once synchronized, the data transfer is effected.

2. Example Environment

Before describing the invention in detail, it is useful to describe a simple example environment in which the invention can be implemented. One such example environment is a portable electronic device having personal data organizer functionality, or other data gathering capability in which it is desirable to exchange or share data with a host computer. One particular application of such a device is a wireless communication device such as, for example, a cellular, GSM, PCS, radio, or other wireless communication handset. Such handsets or communication devices provide wireless communication services and often include a keypad for control and data entry of the device, as well as a display to provide information to the user regarding the communication or regarding information entered by the user on the keypad.

Wireless communication handsets or devices such as those that would benefit from the various features and aspects of the present invention, can be implemented in a number of different configurations with a number of different architectures. In fact, as will become apparent to one of ordinary skill in the art after reading this description, implementation of the features of the present invention is not dependent on a particular or specific architecture of the electronic device or communication device. However, to provide a backdrop for the description of the features, an example wireless communication device is described with reference to FIG. 1.

Figure 1:
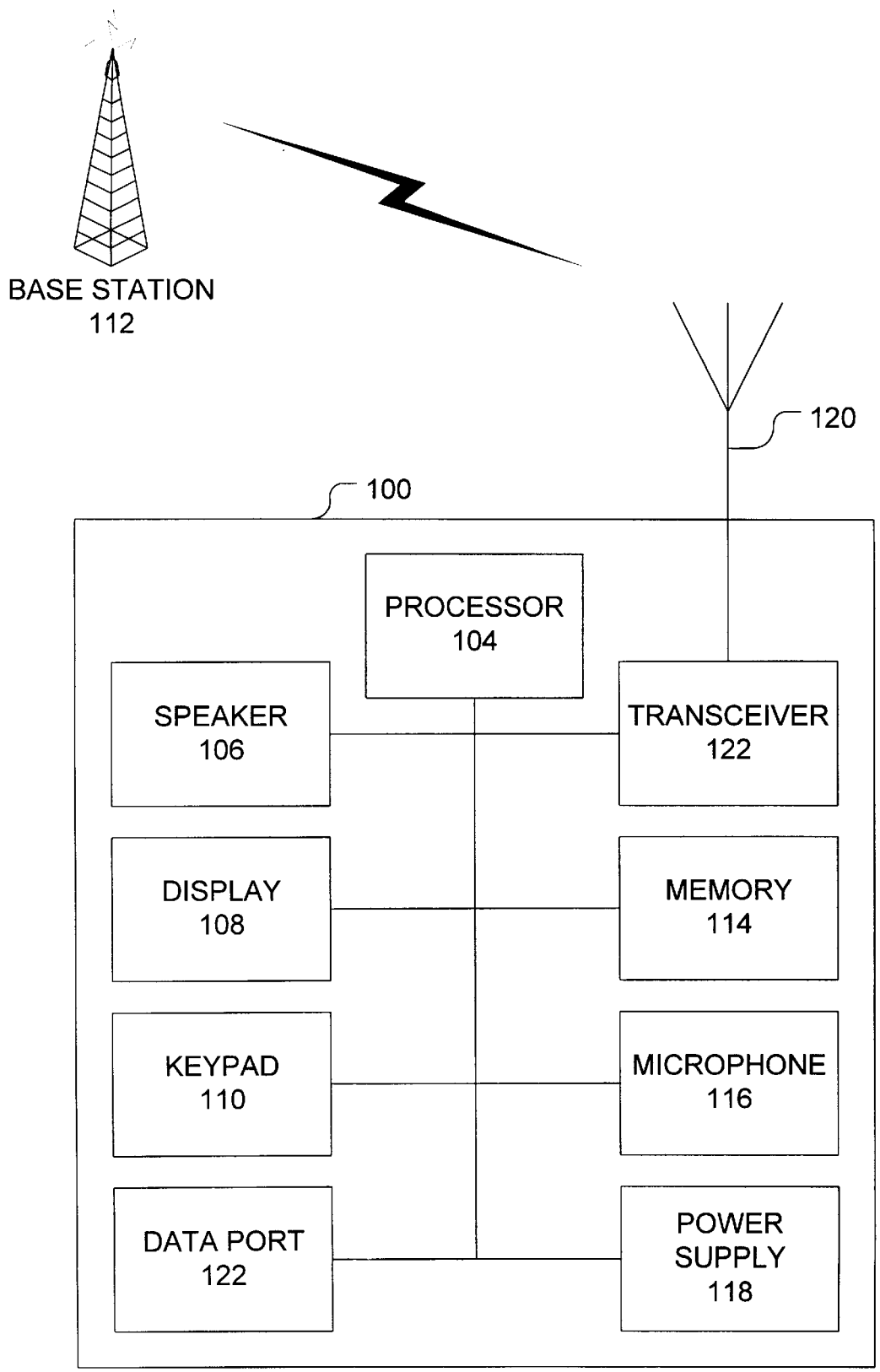
FIG. 1 is a block diagram illustrating an example implementation of an electronic device according to one embodiment of the invention. Specifically, the electronic device illustrated

Referring now to FIG. 1, the wireless communication device 100 includes a processor 104, a speaker 106, a display 108, a keypad 110, a transceiver 112, a memory 114, a microphone 116, a power source 118, a data port 122 and an antennae 120. Wireless communication device 100 can be a handheld handset, integrated vehicle phone or other preferably wireless communication device configured to communicate with other communications devices such as, for example, a base station 112 or other communication device. Contemporary communication handsets typically include one or more processors 104 to control the operation and the features of the handset. Processor 104 typically has associated therewith computer program code running on the processor to carry out the functionality of the device.

Memory 114 such as RAM, ROM, or other memory, can be included and interfaced with the processor to store the program code and to provide other storage space for data or other information useful in executing the program code as well as in carrying out functions of the handset. In fact, the features and functionality of the present invention can be implemented using hardware, software, or a combination thereof, and such software can run on a processor such as processor 104.

Communication handsets 100 typically also include a transceiver 112. Transceiver 112 provides a transmitter to transmit voice and data information via antenna 120 to a recipient communication device such as, for example, base station 112. Transceiver 112 typically also includes a receiver to receive voice and data communication from another communication device (e.g., base station 112) and to provide the received voice and data information to the user or to facilitate internal functionality of the handset.

User interface portions of the typical wireless communication handset 100 include a speaker 106, a display 108, a keypad 110, and a microphone 116. Microphone 116 accepts voice or other audio information from the user, converts this information to electrical signals such that they can be transmitted by the transceiver to a recipient. Likewise, speaker 106 converts electrical signals received by transceiver 112 into audio information that can be heard by a user of the wireless communication device 100.

Display 108 can be used to display information to the user such as, for example, call information, keypad entry display, signal presence and signal strength display, battery life display, or any other information useful to the user. Display 108 can include any type of display, but is preferably a liquid crystal display (LCD) due to the LCD's low power consumption characteristics. Display 108 can also include other visual displays such as, for example, light emitting diode (LED) indicators or other visual indicators.

Keypad 110 can be implemented using a numeric or an alphanumeric keypad and can also include special function keys. In one embodiment, keypad 110 includes back lighting such that information on the keys can be viewed by the user in low light or dark conditions. Many electronic devices including wireless communication devices include a flip panel (not illustrated) that can be closed to conceal some or all of the keys on the keypad.

Power source 118 is used to provide power to one or more of the components of the wireless communication handset 100. Power source 118 can be implemented, for example, using rechargeable batteries such as NiCad or NiMH rechargeable batteries. Other power sources can be included in addition to or in place of batteries.

Data port 122 can be used to exchange or share data with a host computer or other device. For example, where the functionality of the device includes personal organizer functionality, a user may wish to upload collected contact information to his or her laptop or desktop computer. Data port 122 can be a hard wired or wireless data port and can use any of a number of different communication standards. One such example communication standard prominent in PC interfaces is RS-232.

The invention is described herein in terms of this example application in this example environment. Description in these terms is provided for ease of discussion only. After reading the description herein, it will become apparent to one of ordinary skill in the art that the present invention can be implemented in any of a number of different electronic devices or architectures, where it is desirable to share or exchange information with another device, such as for example, a host computer.

3. Enhanced Synchronization

The present invention is directed toward a system and method for providing enhanced synchronization of electronic devices. As stated above, the present invention is more specifically directed toward a system and method for providing automatic synchronization and data transfer between a portable electronic device such as, for example, an electronic organizer, and a host computer such as, for example, the user's desktop or laptop computer. The automatic synchronization is described herein in terms of the example application of the wireless communication handset 100. After reading this description, it will become apparent to one of ordinary skill in the art how to implement the various aspects of the invention with alternative electronic devices in alternative applications.

Figure 2:
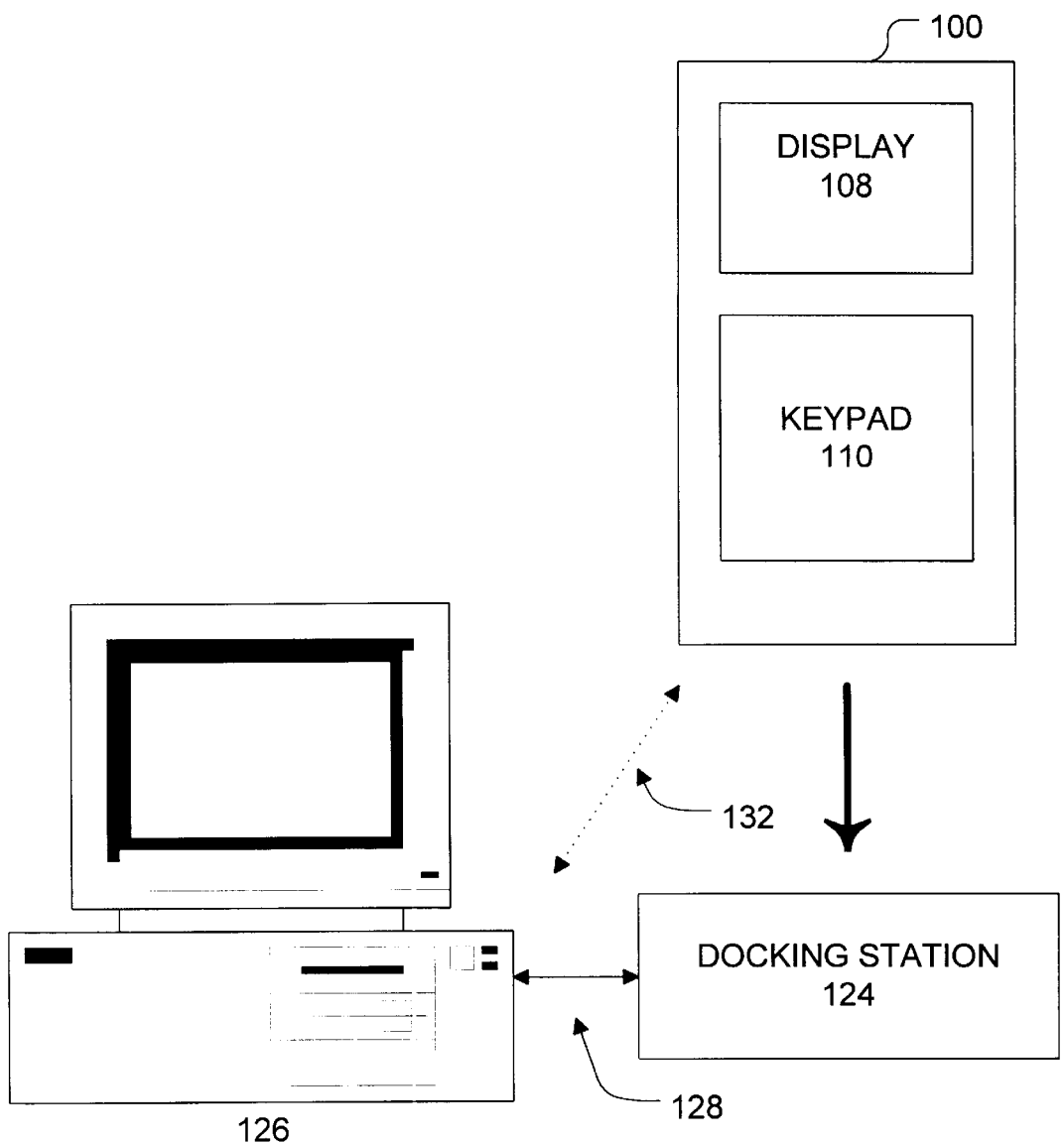
FIG. 2 is a block diagram illustrating an example of an electronic device, such as a wireless communication handset, being interfaced to a host computer by a direct cable or a docking station according to one embodiment of the invention.

FIG. 2 is a block diagram illustrating the connection of an electronic device to a host computer according to one embodiment of the invention. In the embodiment illustrated in FIG. 2, the electronic device is a wireless communication handset 100 such as that illustrated in FIG. 1. Handset 100, which includes a display 108 and a keypad 110 can be inserted into a docking station 124. Docking station 124 can include facilities to recharge batteries of wireless handset 100 as well as a communications interface between handset 100 and a host computer 126. As such, docking station 124 typically includes electrical contacts that mate with corresponding contacts on wireless communication handset 100. These contacts provide data connections as well as power connections for battery charging. Docking station 124 may alternatively include alternative devices for electrically coupling with handset 100, including, for example, inductive couplings.

In one embodiment, the data connection between docking station 124 and host computer 126 is a data cable 128. Although other connection means are possible, including, for example, direct bus plug-ins, it is preferable that the connection be a cable 128 such that docking station 124 can be maintained separately from host computer 126. Additionally, cable 128 can be implemented as a wireless communication interface such as, for example, an infrared communication interface.

Also illustrated in FIG. 2 is a direct communication interface 132 between wireless handset 100 and host computer 126. As this illustrates, wireless handset 100 can be interfaced with host computer 126 directly without the need to interface via docking station 124.

Host computer 126 can be implemented as, for example, the user's personal computer. For example, in applications where the electronic device (e.g., wireless handset 100, or other electronic device) includes organizer functions, it may be desirable for the user to synchronize his or her contact and calendar information in the portable device with his or her contact and calendar information stored on his or her personal computer. As such, one application of the invention allows automatic synchronization and exchange of data between applications on the electronic device (e.g., wireless handset 100) and host computer 126. Continuing with this example, host computer 126 may have application programs such as, for example, Microsoft Outlook® or Lotus Notes®, or some other application program that provides the feature of being able to share and synchronize data with a remote data collection source.

In operation, a user may utilize the portable electronic device to gather information. For example, a user on a business trip may use his or her portable organizer to enter business card or contact information of people he or she meets, to store appointment information, to create tasks, generate notes, or otherwise enter or causing information to be entered into the portable electronic device. Upon returning to his or her home or office, the user may wish to synchronize or update their personal computer's database with the new information stored in the portable organizer.

In one scenario, the user may insert the device into a docking station such as docking station 124. Advantageously, circuitry within the electronic device 100 senses that device 100 is now coupled to host computer 126. As such, the data synchronization or updating can occur automatically without additional user intervention being required. Additionally, where docking station 124 includes battery charger functionality, the batteries of the electronic device 100 can be simultaneously charged. Thus, when the user returns to his or her home or office, the user simply inserts the device into docking station 124 and can go about his or her business without performing additional steps to synchronize the data between the device 100 and host computer 126. Similarly, the synchronization process can be initiated by plugging an interface cable 132 into electronic device 100.

Figure 3:
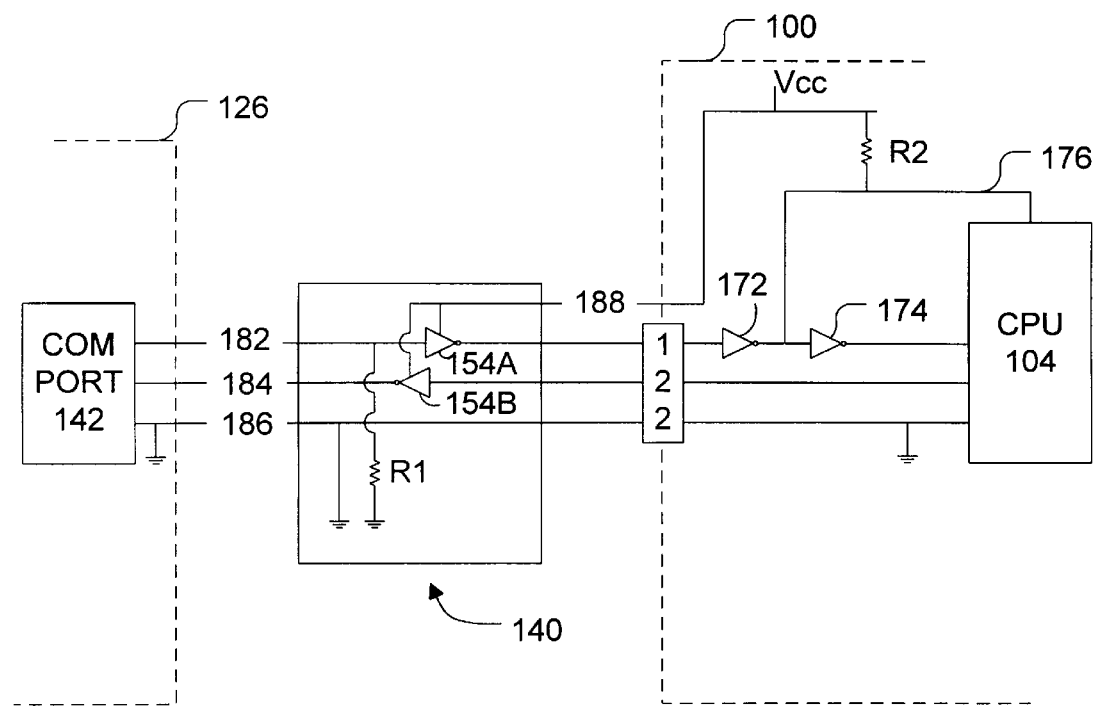
FIG. 3 is a diagram illustrating an example configuration for implementing automatic synchronization according to one embodiment of the invention.

FIG. 3 is a block diagram illustrating an example configuration according to one embodiment of the invention. The embodiment illustrated in FIG. 3 shows an electronic device, such as wireless communication handset 100, connected to a computer, such as host computer 126, via an interface 140. More particularly, interface 140 provides a data connection between a comm port 142 in host computer 126, and data port 122 of wireless handset 100. In terms of the embodiment illustrated in FIG. 2, interface 140 can be implemented, for example, using interface cable 132, or a combination of cable 128 and docking station 124. As stated above, in one embodiment, the data interface between the electronic device and the computer is, for example, an RS-232 interface, although other interface protocols, standards, or formats can be utilized. In the embodiment illustrated in FIG. 3, interface 140 includes a transmit path 182, a receive path 184, and a ground 186. Also provided in interface 140 is a power line 188, which provides power to circuitry included with interface 140 from wireless communication handset 100.

Circuitry in interface 140 includes a transmit buffer 154A and a receive buffer 154B. Buffers 154 receive their power via power line 188 from electronic wireless communication handset 100. Thus, until connector 140 is connected to data port 122, buffers 154 are not enabled or powered on. In the configuration illustrated in FIG. 3, the input of transmit buffer 154A is pulled to a low level by pull-down resistor R1 connected to ground GND. Because transmit buffer 154A is implemented as an inverter, when the interface 140 is connected to data port 122 and transmit buffer 154A is powered on by power line 188, a high level is presented at the transmit pin 162 of data port 122. In the illustrated embodiment, this signal is inverted by inverting buffer 172 and provided to a status input pin 176 of CPU 104. Thus, when interface 140 is connected to data port 122, a logic high level is presented at status in 176. In this embodiment, status pin 176 can be pulled low with a pull-down resistor (not illustrated) to ensure that it is not at a logic high level unless interface 140 is connected to data port 122.

In operation, CPU 104 periodically polls status pin 176, looking for a logic high level. When the logic high level is detected as status pin 176, CPU 104 interprets this as indicating that interface 140 is connected at data port 122. In one embodiment, to avoid ambiguities that may be caused by ground bounce, status pin 176 is polled in at least two clock cycles (preferably successive cycles). This, in turn, indicates to CPU that the wireless communication handset 100 is connected to the host computer 126. As such, CPU 104 can initiate the synchronization process. As this illustrates, the automatic synchronization can take place without user keystrokes, simply by placing the device in docking station 124 (or connecting the device to an interface cable 132). As illustrated and described above, this automatic synchronization takes place without the need for the user to depress a particular key or enter a keystroke combination but, instead, occurs automatically as a result of transmit buffer 154A being supplied power by wireless communication handset 100.

In the embodiment illustrated in FIG. 3, an additional inverting buffer 174 can provided to re-invert the data prior to providing the data to CPU 104 for data transfer. After reading the above description, it will become apparent to one of ordinary skill in the art how to implement the invention utilizing other hardware configurations or other combinations of hardware and software to implement the invention. Additionally, it will become obvious to one of ordinary skill in the art how to implement the invention where status signal 176 is true at a logic low level as opposed to a logic high level. Of course, the choice of inverters for logic components is provided for illustration and description purposes only. One of ordinary skill in the art after reading this description would understand how to implement the functionality using alternative components or circuitry.

As stated, implementation of the invention is not limited to implementation in a wireless communication handset 100. Indeed, the invention can be implemented with any electronic device in which it is desirable to interface this device to another processing system for the purpose of synchronizing or updating data between the two devices. In one embodiment of the invention, the electronic device such as, for example, wireless communication handset 100, can include a user-selectable feature to turn on or off the automatic synchronization function. In fact, in one embodiment, a menu-driven interface can be provided through a combination of display 108 and keypad 110 on the electronic device. In this embodiment, the user can page through or scroll down various menu options, one of which allows the user to enable or disable the automatic synchronization ("autosync") function. Thus, in this embodiment, if the autosync is disabled connection of the device to an interface 140 does not automatically trigger the synchronization. Instead, in this embodiment, manual intervention is required. Alternatively, if autosync is enabled, the user simply needs to connect the device or place it in docking station 124 to automatically begin the synchronization process.

Additionally, it is contemplated that the electronic device including wireless communication handsets 100, may include other communication features that utilize communications in either uni- or bi-directional form across data port 122. As such, it may not be desirable to begin the automatic synchronization process as soon as a logic high level or other true level signal is presented at status pin 176. For example, data port 122 may be used to enable communication on the Internet, other network communications, or communication port 122 may be used as a diagnostic port allowing interface with a diagnostic computer system. In these modes, it may not be desirable to automatically begin synchronization upon detection of an activity or a particular logic level at status pin 176. Thus, software masking or disabling may be used to inhibit automatic synchronization for other data modes.

Figure 4:
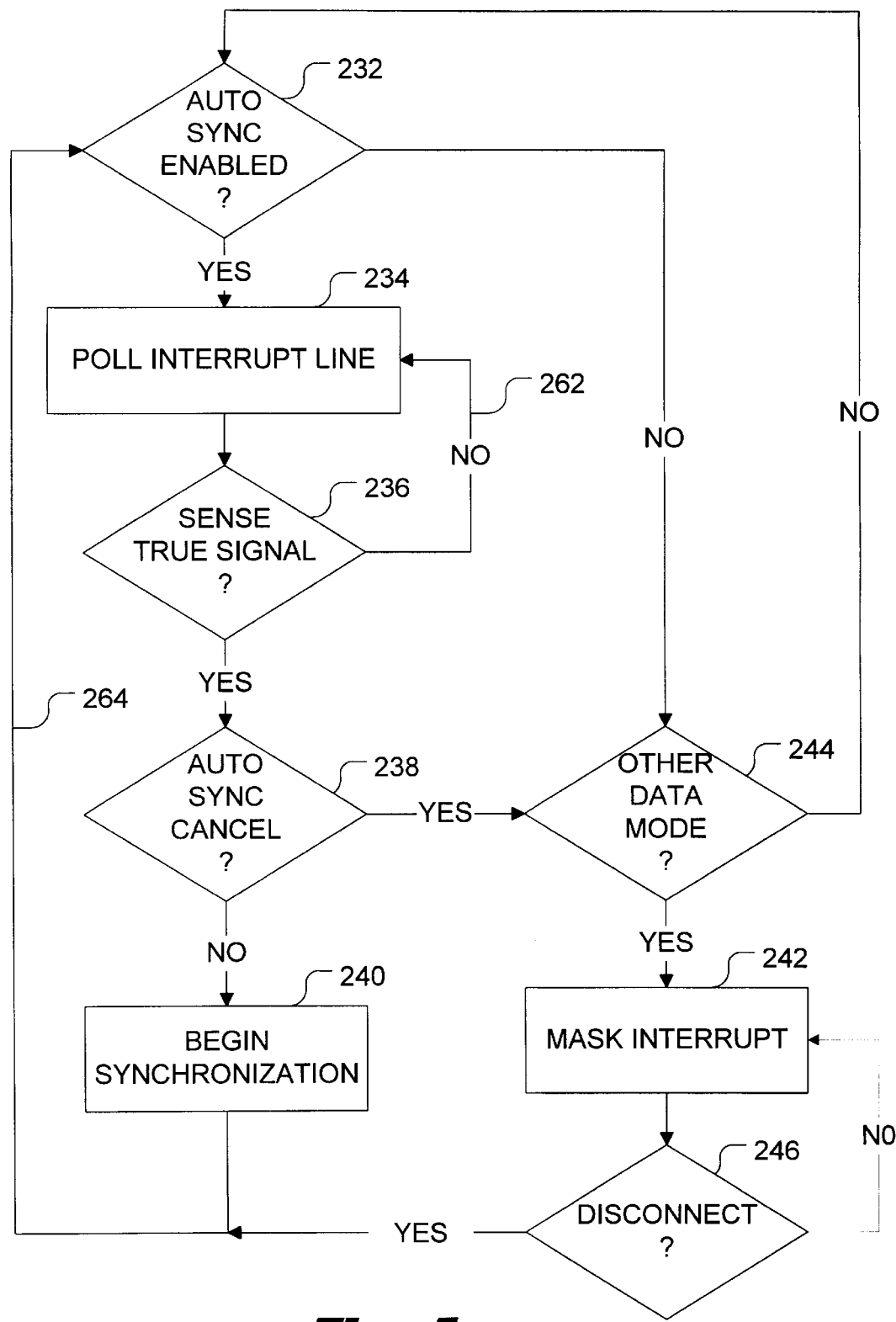
FIG. 4 is an operational flow diagram illustrating a process for carrying out automatic synchronization according to one embodiment of the invention.

FIG. 4 is an operational flow diagram illustrating a process for implementing automatic synchronization according to one embodiment of the invention. In a step 232, the system checks to determine whether autosync is enabled. That is, in embodiments where the autosync feature can be turned on or off at the discretion of the user, the system first checks to determine whether the user desires automatic synchronization to occur upon the connection of interface 140 at data port 122. If in step 232 it is determined that autosync is enabled, CPU 104 polls status line 176 periodically to determine whether status line 176 transitions to its true state. If it is true at the polling interval, the synchronization process begins. This is illustrated by steps 234, 236 and 240.

If status line 176 is not true at the polling interval, processor 104 continues polling until the autosync feature is either cancelled or otherwise disabled. This is illustrated by flow line 262. If, during the synchronization process the user cancels the autosync mode (either before or after synchronization actually begins), the status check is masked and the synchronization process aborted. This is illustrated by steps 238 and 112. Similarly, if autosync is disabled, status signal 176 is masked as well. This is illustrated by steps 232 and 242. Of course, the technique chosen to mask status signal 176 is simply a design choice to be made upon implementation of the invention.

As stated above, there may be applications where other data is transferred via data port 122. In such cases, it may be desirable to disable the autosync process when data port 122 is used to handle communications for these other data modes. As such, the process illustrated in FIG. 4 illustrates the step of checking to determine whether the handset or electronic device is currently configured for another data mode and, if so, the status signal 176 is masked to avoid automatic synchronization in other data modes.

Also illustrated in FIG. 4 is a process for returning to the autosync mode after the device has been disconnected and reconnected to interface 140. This is illustrated by step 246 and flow line 264. This step can be provided for the purpose of allowing the status of autosync to be checked each time the device is connected to interface 140 and to begin the autosync process as illustrated by step 232 each time the device is connected or reconnected to interface 140.

In one or more of the embodiments described above, it is useful to check whether the electronic device has been disconnected from interface 140 and reconnected in determining whether to begin the autosync process. Particularly, in the embodiment described above, this step removes the mask provided to status line 176, allowing the synchronization process to take place even if the electronic device was previously in another data mode during the previous connection. There are several techniques that can be implemented to check to determine whether an electronic device has been disconnected and reconnected to interface 140. One such technique is to check for a high-impedance condition at the input of transmit pin 162. If the high impedance condition occurs, this indicates that the electronic device is disconnected from interface 140. Another technique is to require that the status signal 176 be true over a plurality of sequential clock-cycles. This condition would indicate that data from another data mode is no longer present or being transferred on transmit line at transmit pin 162. Similarly, a false status signal 176 for a given number of clock-cycles may also be used to sense a disconnect of interface 140.

Figure 5:
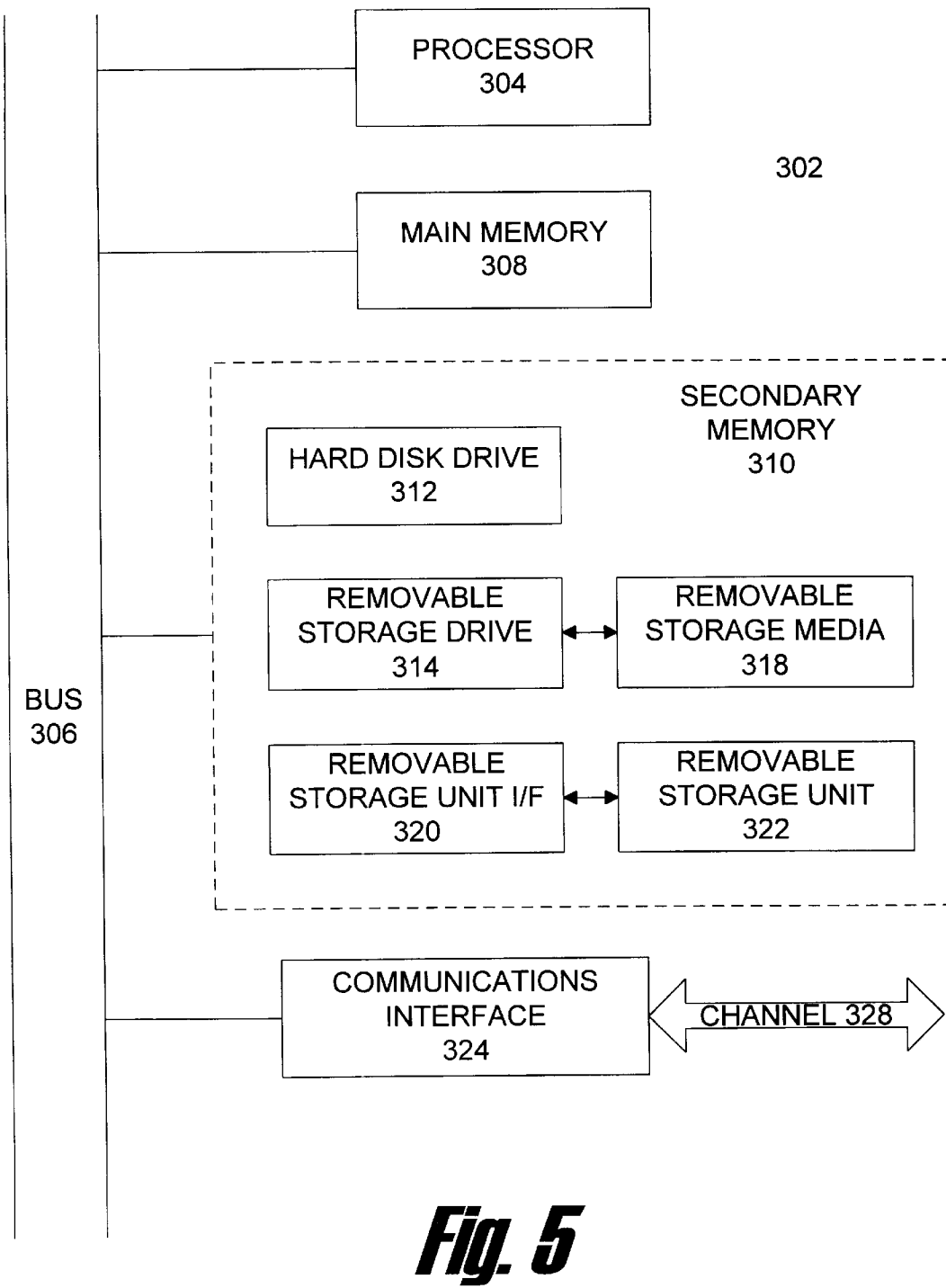
FIG. 5 is a diagram illustrating an example processor-based system according to one embodiment of the invention.

The various embodiments and features of the invention described above may be implemented using hardware, software or a combination thereof and may be implemented using a computing system having one or more processors. In fact, in one embodiment, these elements are implemented using a processor-based system capable of carrying out the functionality described with respect thereto. An example processor-based system 302 is shown in FIG. 5. The computer system 302 includes one or more processors, such as processor 304. The processor 304 is connected to a communication bus 306. Various software embodiments are described in terms of this example computer system. After reading this description, it will become apparent to a person skilled in the relevant art how to implement the invention using other computer or processor systems and/or architectures. The functionality of the invention as described above is not dependent on a particular computer or processor architecture.

Processor-based system 302 can include a main memory 308, preferably random access memory (RAM), and can also include a secondary memory 310. The secondary memory 310 can include, for example, a hard disk drive 312 and/or a removable storage drive 314, representing a floppy disk drive, a magnetic tape drive, an optical disk drive, etc. The removable storage drive 314 reads from and/or writes to a removable storage medium 318 in a well-known manner. Removable storage media 318, represents a floppy disk, magnetic tape, optical disk, etc. which is read by and written to by removable storage drive 314. As will be appreciated, the removable storage media 318 includes a computer usable storage medium having stored therein computer software and/or data.

In alternative embodiments, secondary memory 310 may include other similar means for allowing computer programs or other instructions to be loaded into computer system 302. Such means can include, for example, a removable storage unit 322 and an interface 320. Examples of such can include a program cartridge and cartridge interface (such as that found in video game devices), a removable memory chip (such as an EPROM, or PROM) and associated socket, and other removable storage units 322 and interfaces 320 which allow software and data to be transferred from the removable storage unit 322 to computer system 302.

Computer system 302 can also include a communications interface 324. Communications interface 324 allows software and data to be transferred between computer system 302 and external devices. Examples of communications interface 324 can include a modem, a network interface (such as, for example, an Ethernet card), a communications port, a PCMCIA slot and card, etc. Software and data transferred via communications interface 324 are in the form of signals which can be electronic, electromagnetic, optical or other signals capable of being received by communications interface 324. These signals are provided to communications interface via a channel 328. This channel 328 carries signals and can be implemented using a wireless medium, wire or cable, fiber optics, or other communications medium. Some examples of a channel can include a phone line, a cellular phone link, an RF link, a network interface, and other communications channels.

In this document, the terms "computer program medium" and "computer usable medium" are used to generally refer to media such as removable storage device 318, a disk capable of installation in disk drive 312, and signals on channel 328. These computer program products are means for providing software or program instructions to computer system 302.

Computer programs (also called computer control logic) are stored in main memory and/or secondary memory 310. Computer programs can also be received via communications interface 324. Such computer programs, when executed, enable the computer system 302 to perform the features of the present invention as discussed herein. In particular, the computer programs, when executed, enable the processor 304 to perform the features of the present invention. Accordingly, such computer programs represent controllers of the computer system 302.

In an embodiment where the elements are implemented using software, the software may be stored in, or transmitted via, a computer program product and loaded into computer system 302 using removable storage drive 314, hard drive 312 or communications interface 324. The control logic (software), when executed by the processor 304, causes the processor 304 to perform the functions of the invention as described herein.

In another embodiment, the elements are implemented primarily in hardware using, for example, hardware components such as PALs, application specific integrated circuits (ASICs) or other hardware components. Implementation of a hardware state machine so as to perform the functions described herein will be apparent to persons skilled in the relevant art(s). In yet another embodiment, elements are implemented using a combination of both hardware and software.

4. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

We claim:

1. An apparatus for synchronizing a portable electronic device with a host computer, comprising:

an interface, including an interface circuit having a transmit buffer and a receive buffer and a cable configured for connection to a communication port of said host computer and to a data port of said portable electronic device;

a signal path connected between a voltage source of said portable electronic device and said interface, said signal path configured to provide electrical power to said interface circuit upon connection of said cable to said data port of said portable electronic device;

a processor in said portable electronic device, said processor having a status signal input coupled to an output of said transmit buffer, wherein said transmit buffer is configured to output a first logic level upon application of power from said signal path, said first logic level resulting in a true logic level status signal at said status signal input; and computer program code logic, executed by said processor and configured to initiate a synchronization process with said host computer when said status signal presents a true logic level at said status signal input.

2. The system of claim 1, wherein said computer program code logic is configured to initiate said synchronization process when said status signal presents a true logic level at said status signal input for a plurality of successive clock cycles.

3. The system of claim 1, wherein said transmit buffer is an inverting buffer having an input pulled to a logic low level by a pull-down resistor and outputting a logic level high signal when power is applied in the absence of data at said transmit buffer input.

4. The system of claim 3, wherein said status signal is pulled high by a pull-up resistor and said transmit buffer output is inverted to provide a logic low level status signal when power is applied to said transmit buffer in the absence of data at said transmit buffer input.

5. The system of claim 1, wherein said interface comprises a cable having said interface circuitry integrated therewith.

6. The system of claim 1, wherein said interface comprises a docking station and a cable for connecting said docking station to said host computer.

7. The system of claim 6, wherein said interface circuit is integrated within said docking station.

8. The system of claim 6, wherein said docking station includes electrical contacts configured to mate with corresponding electrical contacts on said portable electronic device.

9. The system of claim 1, wherein said portable electronic device is a wireless communication handset.

10. The system of claim 1, wherein said electronic device comprises computer program code logic configured to allow a user to enable or disable automatic synchronization.

11. The system of claim 1, wherein said electronic device further comprises computer program code logic configured to determine whether said electronic device has been disconnected from and reconnected to said interface, and for initiating synchronization upon reconnection.

12. In a portable electronic device, an apparatus for enabling the portable electronic device to automatically synchronize to a host computer without user intervention, upon connection to said host computer, comprising:

a data port configured to connect said portable electronic device to the host computer via an interface;

a power line configured to provide power from said portable electronic device to said data port, wherein connection of said interface to said port supplies power to said interface via said power line, thereby providing power to a buffer in said interface;

a processor in said portable electronic device, said processor having a status signal input coupled to an output of said buffer via said data port, wherein said buffer is configured to output a first logic level upon application of power from said power line, said first logic level resulting in a true logic level status signal at said status signal input; and computer program code logic, executed by said processor and configured to initiate a synchronization process with said host computer when said status signal presents a true logic level at said status signal input.

13. The system of claim 12, wherein said computer program code logic is configured to initiate said synchronization process when said status signal presents a true logic level at said status signal input for a plurality of successive clock cycles.

14. The system of claim 12, wherein said interface comprises a docking station and a cable for connecting said docking station to said host computer, and wherein said synchronization process begins when said electronic device is placed in said docking.

15. The system of claim 12, wherein said portable electronic device is a wireless communication handset.

16. The system of claim 12, wherein said electronic device comprises computer program code logic configured to allow a user to enable or disable automatic synchronization.

17. The system of claim 12, wherein said electronic device further comprises computer program code logic configured to determine whether said electronic device has been disconnected from and reconnected to said interface, and for initiating synchronization upon reconnection.

* * * * *